United States Patent [19]
Pedrini

[11] Patent Number: 5,456,397
[45] Date of Patent: Oct. 10, 1995

[54] SKI CLAMP FOR MOTOR VEHICLE RACK

[76] Inventor: Fabio Pedrini, Via Zamboni No. 1 Scala "A", Piano 1 Int 3 CAP 40125, Bologna, Italy

[21] Appl. No.: 299,248

[22] Filed: Aug. 31, 1994

Related U.S. Application Data

[63] Continuation of Ser. No. 25,220, Mar. 2, 1993, abandoned.
[51] Int. Cl.[6] ..................................................... B60R 9/00
[52] U.S. Cl. .......................... 224/324; 224/316; 224/917
[58] Field of Search .................................. 224/324, 917, 224/316, 319, 321, 323, 309, 310

[56] References Cited

U.S. PATENT DOCUMENTS

| | | | |
|---|---|---|---|
| 3,836,058 | 9/1974 | Penniman et al. | 224'917 |
| 3,848,785 | 11/1974 | Bott | 224/324 |
| 4,274,568 | 6/1981 | Bott | 224/324 |
| 4,312,467 | 1/1982 | Kulwin | 224/917 |
| 4,940,175 | 7/1990 | Tittel | 224/316 |

FOREIGN PATENT DOCUMENTS 9010557  9/1990  WIPO ............................... 224/319

*Primary Examiner*—Linda J. Sholl
*Attorney, Agent, or Firm*—Willian Brinks Hofer Gilson & Lione

[57] ABSTRACT

A clamp for supporting elongated articles such as a pair of skis on a motor vehicle includes a support base attachable to a load bar mounted transversely above a motor vehicle. A retaining element is pivotally attached at one end to the support base and is pivotable from an open position in which elongated articles can be inserted in or removed from said clamp to a closed position wherein it can be locked. The retaining element, together with its associated lock, further is pivotable about a second axis from a first position located to the rear of the rearward surface of the support base to a raised position spaced above the top surface of the support base wherein elongated articles can be clamped between the retaining element and the top of the support base. The retaining element is provided with a soft elastomeric surface for engagement with the top of the skis, while the top of the support base is provided with a layer of hard polymeric material to engage the bottom of the skis.

18 Claims, 4 Drawing Sheets

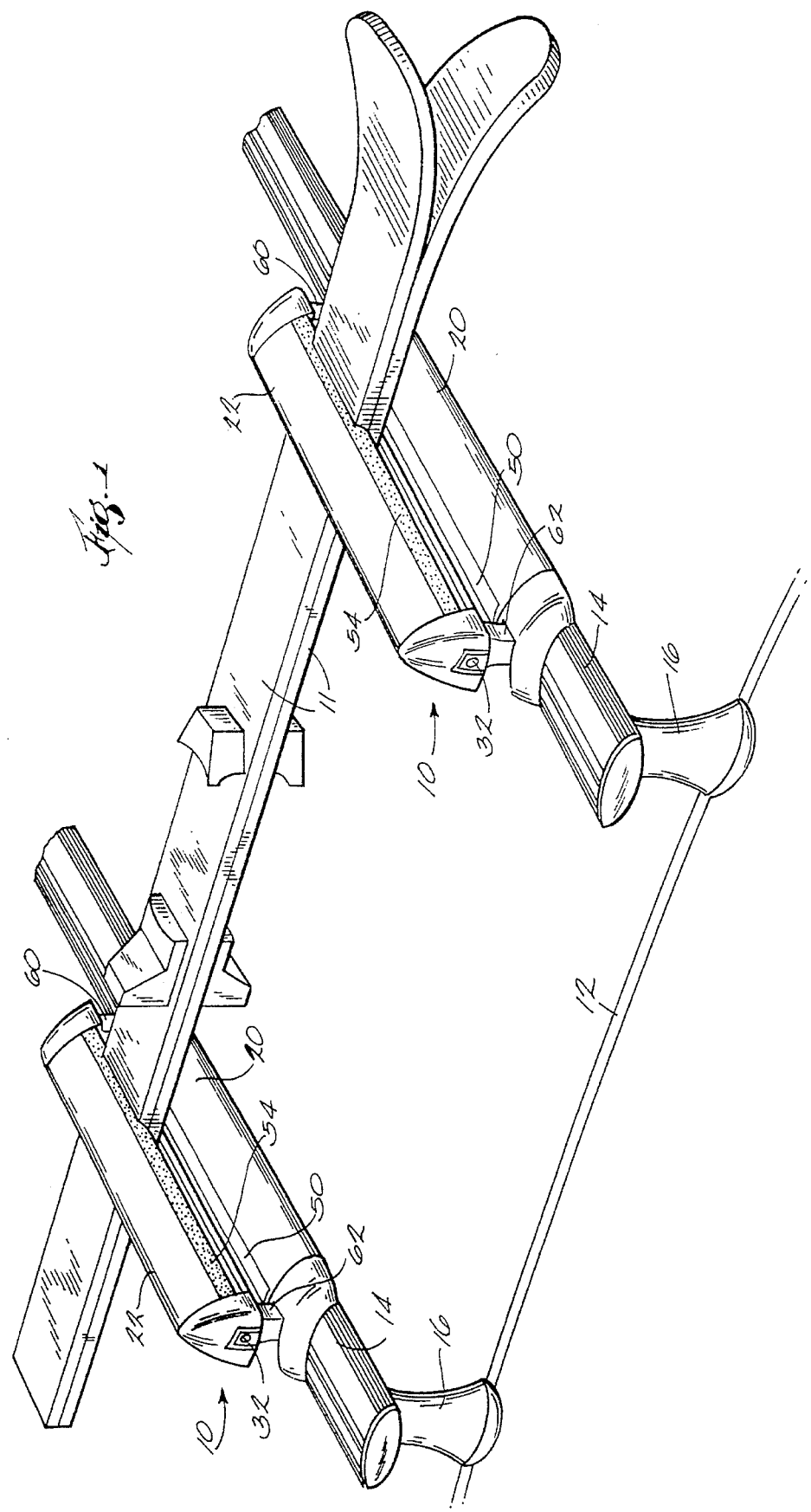

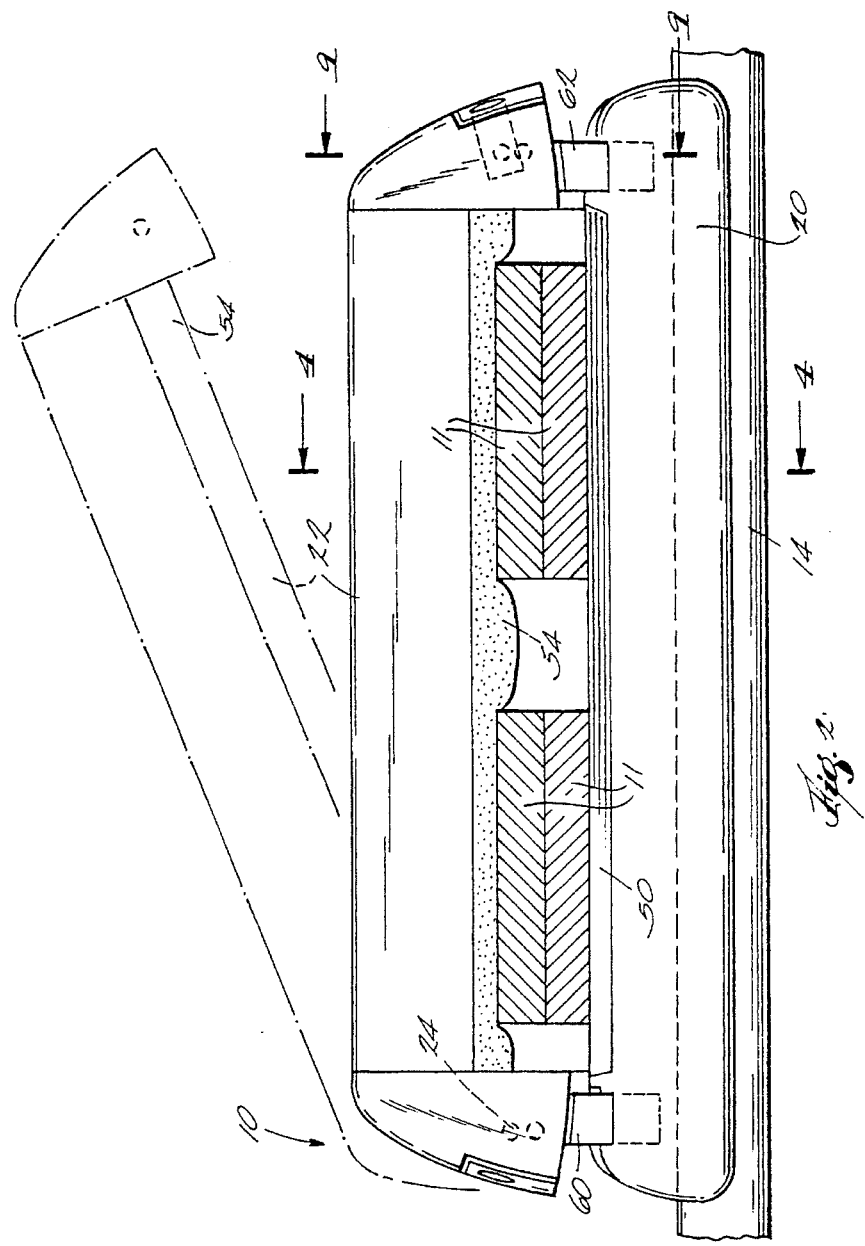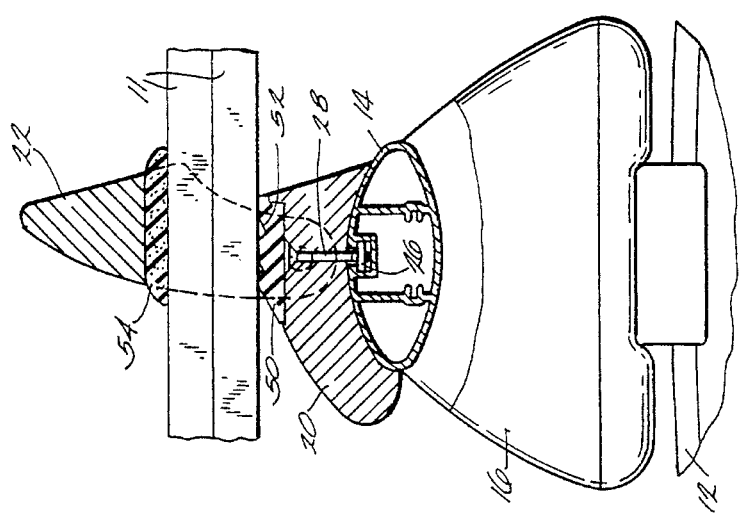

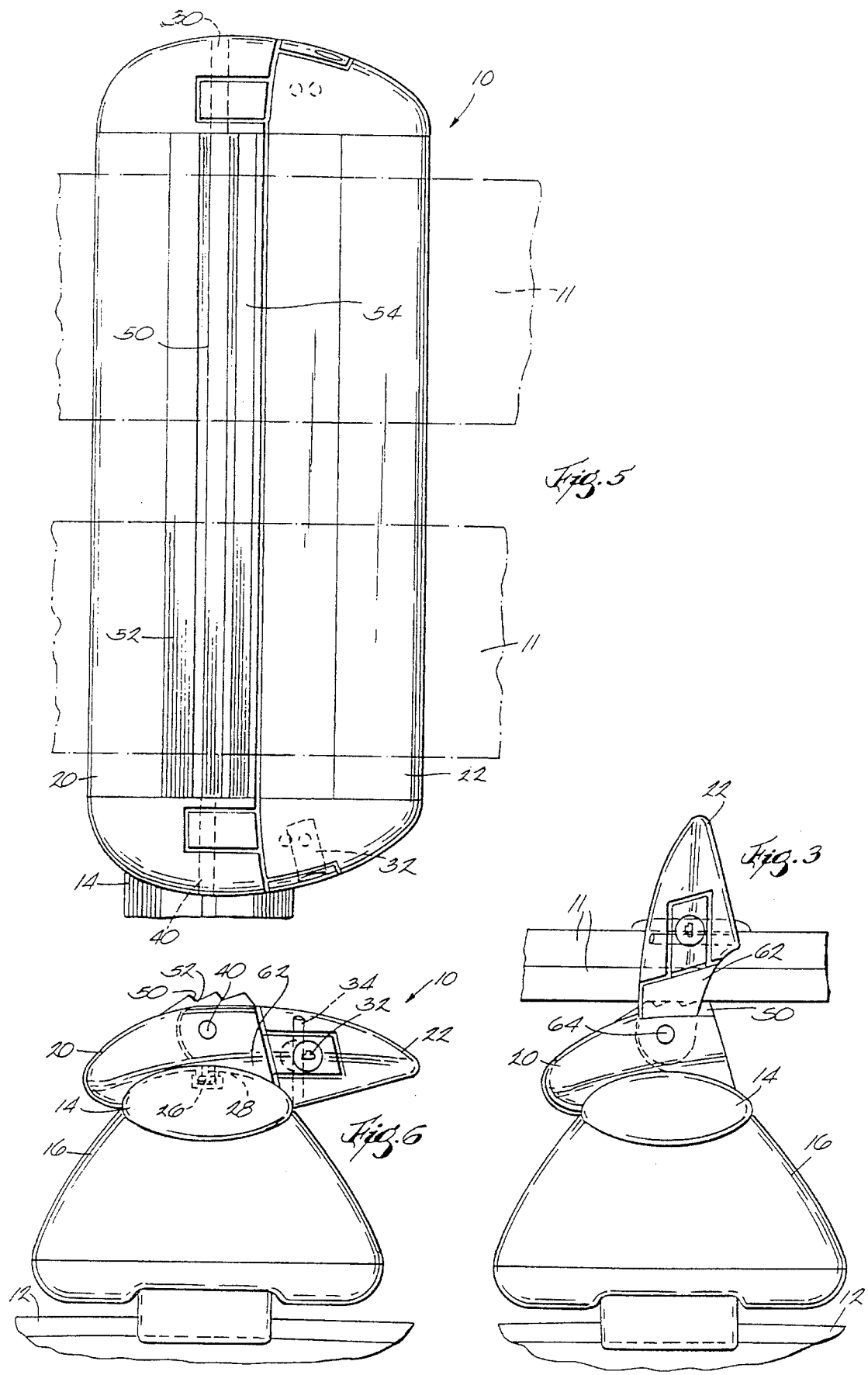

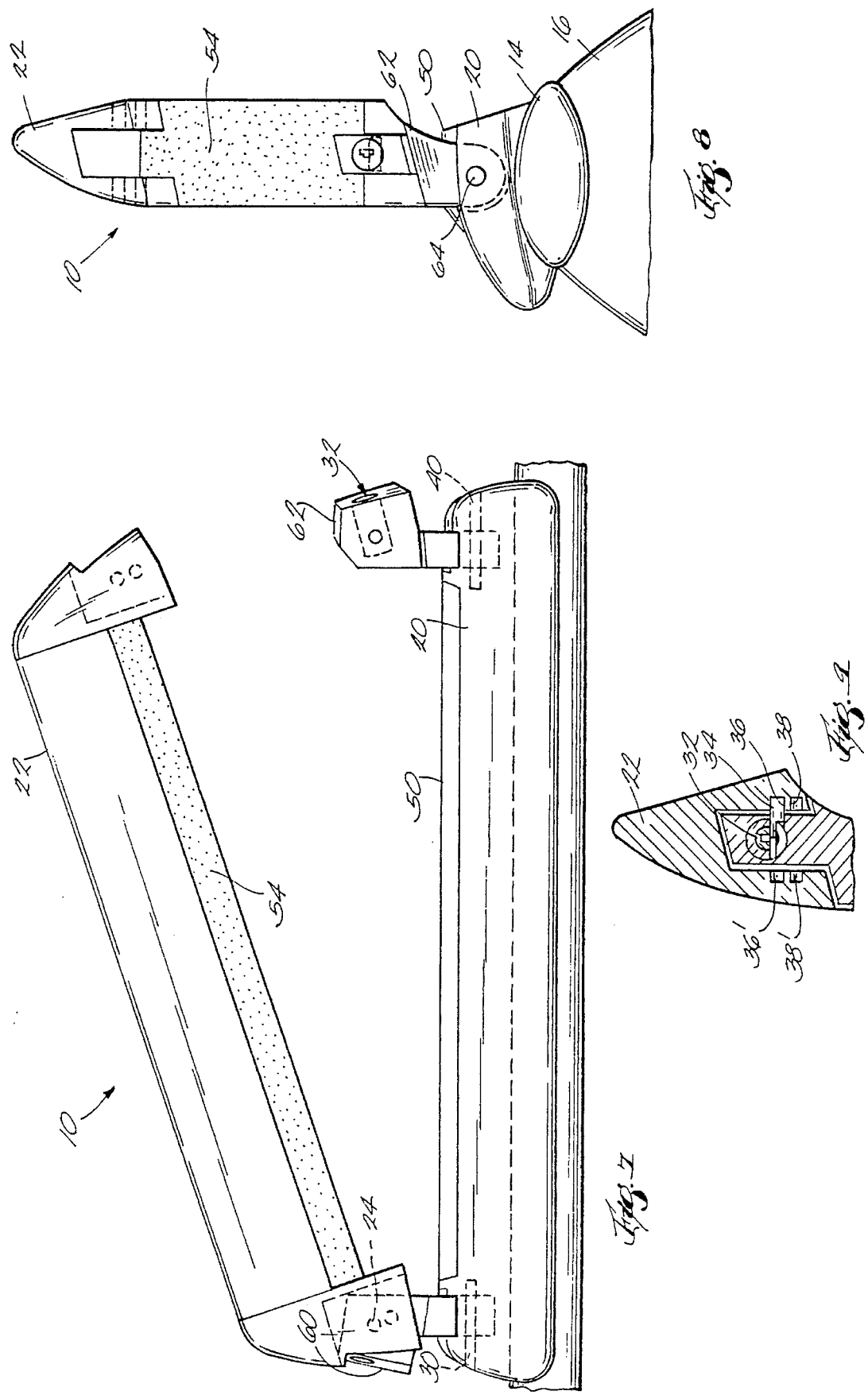

SKI CLAMP FOR MOTOR VEHICLE RACK

This application is a continuation of application Ser. No. 08/025,220, filed Mar. 2, 1993, now abandoned.

FIELD OF THE INVENTION

The present invention relates to a clamp for holding elongated articles on carrier attached to a motor vehicle. More particularly, the invention pertains to such a clamp adapted to hold elongated articles, such as skis, on a vehicle associated carrier, such as a luggage rack, ski rack or other carrier.

BACKGROUND OF THE INVENTION

Many article carriers, such as luggage racks, ski racks, bicycle racks or the like, have been used for securing articles to be transported to a motor vehicle. In the case of skis, for example, it has been proposed to clamp the ski between forward and rearward clamping bars, which are secured together to hold the skis together for transportation. Various clamps suited to retain other articles, such as bicycles, have also been used.

SUMMARY OF THE INVENTION

In accordance with the present invention, there is provided an adjustably positionable clamp for an article carrier. An important aspect of the invention is to provide such a clamp for securing elongated articles, such as a skis, to a motor vehicle. A further aspect of the invention is to provide a pair of clamps, each of which is adapted to support one end of an elongated article, such as a ski. In accordance a further aspect of the invention, provision is made for such a clamp that will hold in place four or more skis. Another aspect of the invention is in providing a clamp that has an aerodynamically desirable profile for carrying elongated articles, such as skis, at highway speeds, and to provide such a clamp of a light-weight construction, that provides economy both in manufacture of the clamp and in fuel consumption by the motor vehicle.

The invention provides such a clamp that includes a support base provided with means to attach the base to a motor vehicle, or, more preferably, to a load bar that is in turn secured to the motor vehicle. A retaining element is pivotally attached to the support base, which retaining element can be lifted to an open position for loading and unloading elongated articles, such as skis, and can be locked in a closed position for retaining the articles. The support base and retaining element have aligned cooperating clamping surfaces that, when closed, engage opposite sides of the ski or other article. At least one, and preferably both, opposed surfaces of the channel are provided with a resilient surface. The retaining element is pivotally attached to the support base so that it can be pivoted from an empty, aerodynamically configured travel position to a use position for transporting one or more pairs of skis that are held against the top of the support base by the retaining element. The lower surface of the retaining element is provided with a layer of soft rubber or elastomer that resiliently engages the top skis or other elongated articles to hold them in place while protecting their surfaces against marring.

In accordance with a further aspect of the invention, a resilient surface is provided in the form of a layer of hard rubber or plastic material is provided on the top of the support base. Thus the skis when transported are clamped between the relatively hard and soft rubber surfaces. The hard rubber surface is preferably provided with surface indentations, which assist in firmly retaining skis or other articles in the clamp.

Briefly summarized, the invention provides a clamp for supporting elongated articles such as a pair of skis on a motor vehicle that includes a support base attachable to a load bar mounted transversely above a motor vehicle. A retaining element is pivotally attached at one end to the support base and is pivotable from an open position in which elongated articles can be inserted in or removed from said clamp to a closed position wherein it can be locked. The retaining element, together with its associated lock, further is pivotable about a second axis from a first position located to the rear of the rearward surface of the support base to a raised position spaced above the top surface of the support base wherein elongated articles can be clamped between the retaining element and the top of the support base. The retaining element is provided with a soft elastomeric surface for engagement with the top of the skis, while the top of the support base is provided with a layer of hard polymeric material to engage the bottom of the skis.

The invention will be further set forth in the following detailed description and accompanying drawings wherein.

DRAWINGS

FIG. 1 is a perspective view of a pair of clamps in accordance with the present invention attached to a load bar on the roof top of an automobile, shown in fragmentary fashion;

FIG. 2 is a front elevational view of a carrier shown in FIG. 1 with a ski shown in cross-section;

FIG. 3 is a side elevational view of the carrier of FIG. 2 as viewed from the right;

FIG. 4 is a cross-sectional view taken along line 4—4 of FIG. 2;

FIG. 5 is a top view of a carrier of this invention shown in the empty position;

FIG. 6 is a side elevational view of the carrier of FIG. 5;

FIG. 7 is a front elevational view of a carrier in the open position ready for loading of skis therein;

FIG. 8 is a side elevational view of the carrier of FIG. 7; and,

FIG. 9 is a cross sectional view taken along Line 9—9 of FIG. 2.

DETAILED DESCRIPTION

Referring more particularly to the drawings, there are seen in FIG. 1 a pair of clamps 10 for holding a ski 11 or similar elongated object on the top of a motor vehicle 12. Clamps 10 are mounted on load bars 14 of a car top carrier which are, in turn, mounted on car top 12 by means of supporting legs 16 of conventional design securing the opposite ends of load bar 14 to car top 12.

Each clamp 10 includes a support base 20, a first connecting member 60, a second connecting member 62, and an upper retaining element 22 As shown in FIGS. 2 and 3, the connecting members 60, 62 are pivotally attached to opposite ends of the support base 20 by hinge pins 64 such that the connecting members 60, 62 pivot about an axis that is substantially parallel to the support base 20. In addition, the retaining element 22 is pivotally attached to the first connecting member by a hinge pin 24 such that the retaining element 22 pivots about an axis that is substantially perpendicular to the support base 20.

As best seen in FIGS. 4 and 6, clamp 10 can be attached at its opposite ends to load bar 14 by means of nut 26 and screw 28. Various other attachment means, for example, a nut engaging the load bar 14 by means of a pivoting lever that raises and lowers the nut into clamping engagement with the load bar, or, alternatively, U-shaped clamps or brackets that encompass a load bar and are attached to the bottom of support base 20.

Clamp 10 of this invention is shown in the unloaded position on FIGS. 5 and 6. In this position, retaining member 22 is pivoted downwardly behind support base 20 and forms an aerodynamically desirable profile for movement at highway speeds of an empty device of this invention. FIGS. 2–4 show the device in a loaded position for transporting skis 11. In this position, FIGS. 7 and 8 show the clamp 10 in the open position with retainer element 22 pivoted upwardly about axis 30 for placement of skis in the clamp. The second connecting member 62 includes a disengageable engagement mechanism for securing the retaining element 22 to the second connecting member 62. As illustrated best in FIG. 9, the engagement mechanism can be a lock 32 having a lockpin 34 that is advanced by turning of lock 32 with a key to extend lockpin 34 into one of alternate indentations 36 or 38 in the end of retaining element 22. Alternate indentations 36' and 38' are provided so that the clamp 10 can be utilized either as a right hand or left hand model. The position of lock 32 and hinge 24 are reversed in order to provide a clamp easily accessible from the right side of the car. The embodiments shown in the present drawings are all oriented for ease of access from the left, or driver's side, of the vehicle. Lock 32 is pivotable about an axis 40 that is linearly aligned with pivot axis 30 so that retaining element 22 and lock 32 can be pivoted upwardly as a unit. By unlocking lock 32 retaining element 22 can be raised to the position seen in FIG. 7 for purposes of loading skis in the clamp.

The upper surface of support base 20 is provided with a layer 50 of hard rubber or similar, relatively stiff polymeric material. Surface indentations or textures 52 can be provided to assist in firmly retaining skis 11 in the clamp. Base unit 20 and top layer 50 can be co-extruded, for example, from different types of polyvinylchloride materials for ease of construction. In this case, support base 20 could be formed of rigid, polyvinylchloride polymer while layer 50 can be formed of a hard polyvinylchloride elastomer material. Retaining element 22 is provided with a layer 54 of soft elastomeric material to provide a surface for engagement with skis 11 or similar elongated articles to be transported in the clamps 10. As seen in FIGS. 2 and 4, elastomeric layer 54 is of a sufficiently low durometer rubber materials so that it is deformed by contact with the top of skis 11. Surface 54 will, thus, both prevent skis 11 from being marred and will, as well, firmly hold the skis in clamp 10.

It is, thus, seen that by providing a first pivot axis 24 and a second pivot axis 30,40 it is possible to both open retaining element 22 for purposes of loading and to swing retaining element 22 forward about axis 30,40 so that it is located above base element 20. By such upward pivoting, ski contacting surfaces 50 and 54 are brought into alignment with each other so that they can engage the opposite surfaces of skis 11.

While preferred embodiments of the invention have been shown for purposes of illustration, it will be apparent to those skilled in the art that various further modifications can be made. Thus, the invention should be limited only by the scope of the appended claims.

What is claimed is:

1. A clamp for supporting elongated articles on a motor vehicle, said clamp comprising:

a support base comprising first and second ends and an upper surface disposed between the ends and configured to support said elongated articles;

first and second connecting members;

first and second pivot joints pivotably connecting the first and second connecting members, respectively, to the support base to pivot relative to the support base about a first axis extending between the first and second ends;

a retaining element comprising first and second ends and a lower surface disposed between the ends and configured to engage said elongated articles; and a third pivot joint pivotably connecting the retaining element to the first connecting member to pivot relative to the support base about a second axis angled with respect to the first axis.

2. The invention of claim 1 wherein the third pivot joint pivotably connects the first end of the retaining element to the first connecting member such that the retaining element is pivotable between an open position, in which the upper surface is angled with respect to the lower surface and the elongated articles can be placed on and removed from the lower surface, and a closed position, in which the elongated articles are retained between the upper and lower surfaces.

3. The invention of claim 1 wherein the first and second pivot joints connect the first and second ends of the support base to the first and second ends of the retaining element, respectively.

4. The invention of claim 1 wherein the support base comprises a rearward surface extending alongside the upper surface, and wherein the retaining element is pivotable about the first axis between a first position, in which the lower surface is located rearwardly of the rearward surface, to a raised position, in which the lower surfaces is positioned adjacent the upper surface to clamp elongated articles therebetween.

5. The invention of claim 4 wherein the retaining member and the support base together from an aerodynamically configured unit when the retaining element is pivoted to the first position.

6. The invention of claim 5 wherein the lower surface of the retaining member lies closely adjacent to the rearward surface of the support base when the retaining element is pivoted to the first position to form said aerodynamically configured unit.

7. The invention of claim 1 wherein the lower surface of the retaining element is provided with an elastomeric surface for engaging the elongated articles.

8. The invention of claim 1 wherein the upper surface of the support base is provided with a layer of polymeric material to support and engage the elongated articles.

9. The invention of claim 2 further comprising a disengageable engagement mechanism releasably interconnecting the retaining element and the second connecting member to selectively hold the retaining element in the closed position.

10. The invention of claim 1 further comprising means for fixing the support base to a load bar mounted above a vehicle such that the first and second pivot joints allow the retaining element and the connecting members to pivot relative to the support base about the first pivot axis while the support base is fixed to the load bar.

11. The invention of claim 10 wherein the fixing means comprises a nut shaped to be retained in a T-channel of the load bar and a screw passing through an aperture in the support base and mated with the nut.

12. The invention of claim 10 wherein the fixing means comprises a U-shaped fastener configured to engage the support base to the load bar.

13. The invention of claim 1 wherein the first, second and third pivot joints comprise respective hinge pins.

14. A clamp for supporting elongated articles on a motor vehicle, said clamp comprising:

a support base comprising a support surface configured to support said elongated articles;

first and second connecting members;

first and second pivot joints pivotably connecting the first and second connecting members, respectively, to the support base to pivot relative to the support base about a first axis;

a retaining element comprising a retaining surface configured to retain said elongated articles;

a third pivot joint pivotably connecting the retaining element to the first connecting member to pivot relative to the support base about a second axis angled with respect to the first pivot axis toward and away from the second connecting member; and a disengageable engagement mechanism releasably interconnecting the retaining element to the second connecting member.

15. The invention of claim 14 wherein the support base comprises a rearward surface extending alongside the support surface, and wherein the retaining element is pivotable about the first axis between a first position, in which the retaining surface is located rearwardly of the rearward surface, to a raised position, in which the retaining surfaces is positioned adjacent the support surface to clamp elongated articles therebetween.

16. The invention of claim 15 wherein the retaining member and the support base together from an aerodynamically configured unit when the retaining element is pivoted to the first position.

17. The invention of claim 15 wherein the retaining surface of the retaining member lies closely adjacent to the rearward surface of the support base when the retaining element is pivoted to the first position to form said aerodynamically configured unit.

18. The invention of claim 14 wherein the third pivot joint pivotably connects the retaining element to the first connecting member such that the retaining element is pivotable between an open position, in which the retaining surface is angled with respect to the support surface and the elongated articles can be placed on and removed from the support surface, and a closed position, in which the elongated articles are retained between the retaining and support surfaces.

* * * * *